United States Patent [19]
Chang

[11] Patent Number: 5,815,334
[45] Date of Patent: Sep. 29, 1998

[54] DIGITAL SIGNAL DETECTOR FOR CORRECTING SIGNALS OF A MAGNETIC RECORDING/REPRODUCING DEVICE

[75] Inventor: Yong-Deok Chang, Suwon, Rep. of Korea

[73] Assignee: Samsung Electronics Co., Ltd., Kyungki-Do, Rep. of Korea

[21] Appl. No.: 668,819

[22] Filed: Jun. 24, 1996

[30] Foreign Application Priority Data

Oct. 24, 1995 [KR] Rep. of Korea ...................... 95-36862

[51] Int. Cl.$^6$ ....................................................... G11B 5/09
[52] U.S. Cl. ............................................... 360/53; 360/41
[58] Field of Search .................................. 360/53, 51, 40, 360/41, 48, 49, 65, 45, 46; 369/59

[56] References Cited

U.S. PATENT DOCUMENTS

| | | | |
|---|---|---|---|
| 3,818,501 | 6/1974 | Fiorino | 360/40 |
| 5,343,335 | 8/1994 | Hara | 360/45 |
| 5,550,683 | 8/1996 | Koren | 360/46 |

*Primary Examiner*—Tan Dinh

*Attorney, Agent, or Firm*—Sughrue, Mion, Zinn, Macpeak & Seas, PLLC

[57] ABSTRACT

A digital signal detector for a digital magnetic recording/reproducing device detects corrected signals using a differentiation feature of a recording/reproducing segment of the device, to reduce performance degradation due to signal distortion. The detector includes a precoder for converting an input digital signal into a non-return-to-zero-inverter (NRZI) waveform signal; a recording/reproducing portion for recording the signal output from the predecoder and reproducing the recorded signal; a linear equalizer for compensating the distorted amplitude of the signal reproduced by the recording/reproducing portion; a signal corrector for correcting a signal output from the linear equalizer using a signal correlation process; an integration detector for integrating the signal corrected by the signal corrector; and a predecoder for decoding the signal integrated by the integration detector into its original signal. The digital signal detector corrects reproduced signals, integrates the corrected reproduction signals having differentiated components of the recording/reproducing portion and then limits the integrated signals to a certain value, thereby reducing errors due to the accumulation of integration error values and reducing hardware volume.

5 Claims, 3 Drawing Sheets

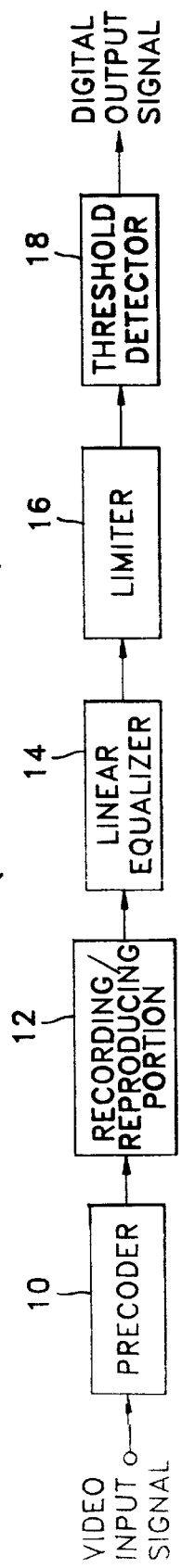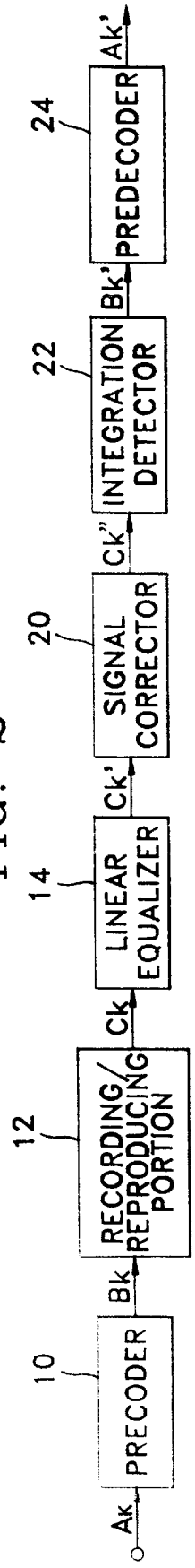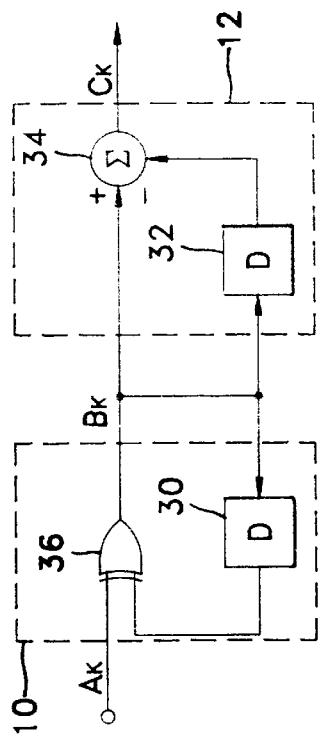
FIG. 1 (PRIOR ART)
FIG. 2
FIG. 3

DIGITAL SIGNAL DETECTOR FOR CORRECTING SIGNALS OF A MAGNETIC RECORDING/REPRODUCING DEVICE

BACKGROUND OF THE INVENTION

The present invention relates to a digital signal detector for decoding recorded signals in a digital magnetic recording/reproducing device, and more particularly, to a digital signal detector for decoding original data from reproduced data.

In a partial-response system, an input digital signal is output as a tri-state signal through a magnetic recording/reproducing portion, and the output signal is distorted by the recording/reproducing portion and noise. A Viterbi algorithm, i.e., a maximum likelihood sequence estimator, is used as a method of detecting and decoding an original signal from the distorted signal. Though this method exhibits good performance in signal detection, the hardware volume is greater than in the case of a threshold detection method. Meanwhile, the threshold detection method, though enjoying a simpler structure, performs poorly in systems where the signal amplitude is distorted.

FIG. 1 shows a conventional digital signal detector employing a method of detecting signal amplitudes using a threshold level. Here, the digital signal detector is constituted by a precoder 10 for converting an input signal into a signal having a non-return-to-zero inverter (NRZI) waveform shape, a recording/reproducing portion 12 for recording the signal converted by the precoder 10, and reproducing the recorded signal, a linear equalizer 14 for compensating for the amplitude distortion of a signal output from the recording/reproducing portion 12, a limiter 16 for limiting the amplitude of the signal output from the linear equalizer 14 to a predetermined level, and a threshold detector 18 for comparing a tri-state signal output from the limiter 16 with a predetermined threshold level signal and detecting the digital signal by a compared resultant value.

The digital signal detector using threshold voltage shown in FIG. 1 operates as follows.

First, the input signal is precoded by the precoder 10, and then recorded and reproduced in the recording/reproducing portion 12. The reproduced signal output from the recording/reproducing portion 12 is amplified by a reproducing amplifier (not shown). The linear equalizer 14 compensates the amplitude and a phase component which are distorted by noise and the recording/reproducing portion feature of the signal output from the reproducing amplifier. The equalized signal amplitude output from the linear equalizer 14 is determined by the limiter 16.

To decode the signals, the tri-state signals output from the limiter 16 are compared with threshold levels +A/2 and −A/2. That is, if the reproduced input signal is larger than +A/2 or smaller than −A/2, it is determined as a "1"; but if it exists between these threshold levels, it is set at "0." Here, "A" denotes a voltage level of the input signal.

The above conventional digital signal detector using a threshold level has a simple circuit structure and detects signals by a simple comparison. Such a device is suitable for use with relatively low recording density and good recording/reproducing portion features. However, in a system using a short wavelength for high density recording, signal amplitude is greatly distorted over frequency and the recording/reproducing portion feature is deteriorated, which degrades system performance.

SUMMARY OF THE INVENTION

To solve the above problems, it is an object of the present invention to provide a digital signal detector which can enhance reproduced signal detection by correcting signals using the correlation between signals (i.e., a partial-responsen feature) and limiting the corrected signals using a limiter in an integrator, to compensate for the signal distortion generated due to recording/reproducing portion characteristics.

To accomplish the above object, there is provided a digital signal detector for a magnetic recording/reproducing device, comprising: a precoder for converting an input digital signal into a non-return-to-zero-inverter (NRZI) waveform signal; a recording/reproducing portion for recording the signal output from the predecoder and reproducing the recorded signal; a linear equalizer for compensating the distorted amplitude of the signal reproduced by the recording/reproducing portion; a signal corrector for correcting a signal output from the linear equalizer by using the correlation of the signal; an integration detector for integrating the signal corrected by the signal corrector; and a predecoder for decoding the signal integrated by the integration detector into its original signal.

In the signal corrector according to the present invention, if the present and previous values are both positive, the smaller of the two is corrected to "0"; and if a negative signal value is followed by another negative, the larger of the two is corrected to "0", using the correlation of signals due to the differentiation feature of the recording/reproducing portion.

Also, according to the present invention, the signal corrector comprises: a first comparator for comparing an input signal with a 0 signal; a second comparator for comparing the input signal with the input signal which is delayed by a delay time (1T); first logic means for logically combining the output from the first comparator with the output signal delayed by the delay time 1T and outputting an AND resultant and an OR resultant; a first switch for selecting one signal from among the input signal and a 0 signal, in accordance with a first control signal; a second switch for selecting one signal from among the 0 signal and the signal which is output from the first switch and then delayed by the time 1T, in accordance with a second control signal; and second logic means for generating the first and second control signals based on the outputs of the first logic means and the second comparator.

According to the present invention, the first logic means comprises: a first AND gate for receiving the output from the first comparator and a 1T-delayed output thereof; and a NOR gate for receiving the output from the first comparator and a 1T-delayed output thereof.

According to the present invention, the second logic means comprises: a second AND gate for logically combining the output from the second comparator with the AND-operated output from the first logic means, and outputting the resultant; a third AND gate for logically combining the inverted output from the second comparator and the OR-operated output from the first logic means, and outputting the resultant; a fourth AND gate for logically combining the output from the second comparator and the OR-operated output from the first logic means, and outputting the resultant; a fifth AND gate for logically combining the AND-operated output from the first is logic means with the inverted output from the second comparator, and outputting the resultant; a first OR gate for logically combining the outputs from the second and third AND gates, and outputting the resultant; a second OR gate for logically combining the outputs from the fourth and fifth AND gates, and outputting the resultant.

According to the present invention, the integration detector comprises: an adder for summing and accumulating a signal output from the signal corrector and the previous signal which is integrated; a limiter for limiting the integrated value of the signal output from the adder between 0 and 1 values, to reduce signal integration errors, and outputting the limited signal; a memory for storing the signal output from the limiter and outputting the stored signal to said adder; and a third comparator for comparing the signal output from the limiter with a threshold value and outputting a 1 signal if the limiter output signal value larger than the threshold value and outputting a 0 signal if the former is smaller than the latter.

BRIEF DESCRIPTION OF THE DRAWINGS

The above object and advantage of the present invention will become more apparent by describing in detail a preferred embodiment thereof with reference to the attached drawings in which:

FIG. 1 is a block diagram for showing a conventional digital signal detector;

FIG. 2 is a block diagram for showing a digital signal is detector according to the present invention;

FIG. 3 shows an NRZI system showing the precoder and recording/reproducing portion shown in FIG. 2 as a model;

DETAILED DESCRIPTION OF THE INVENTION

Figure 4:
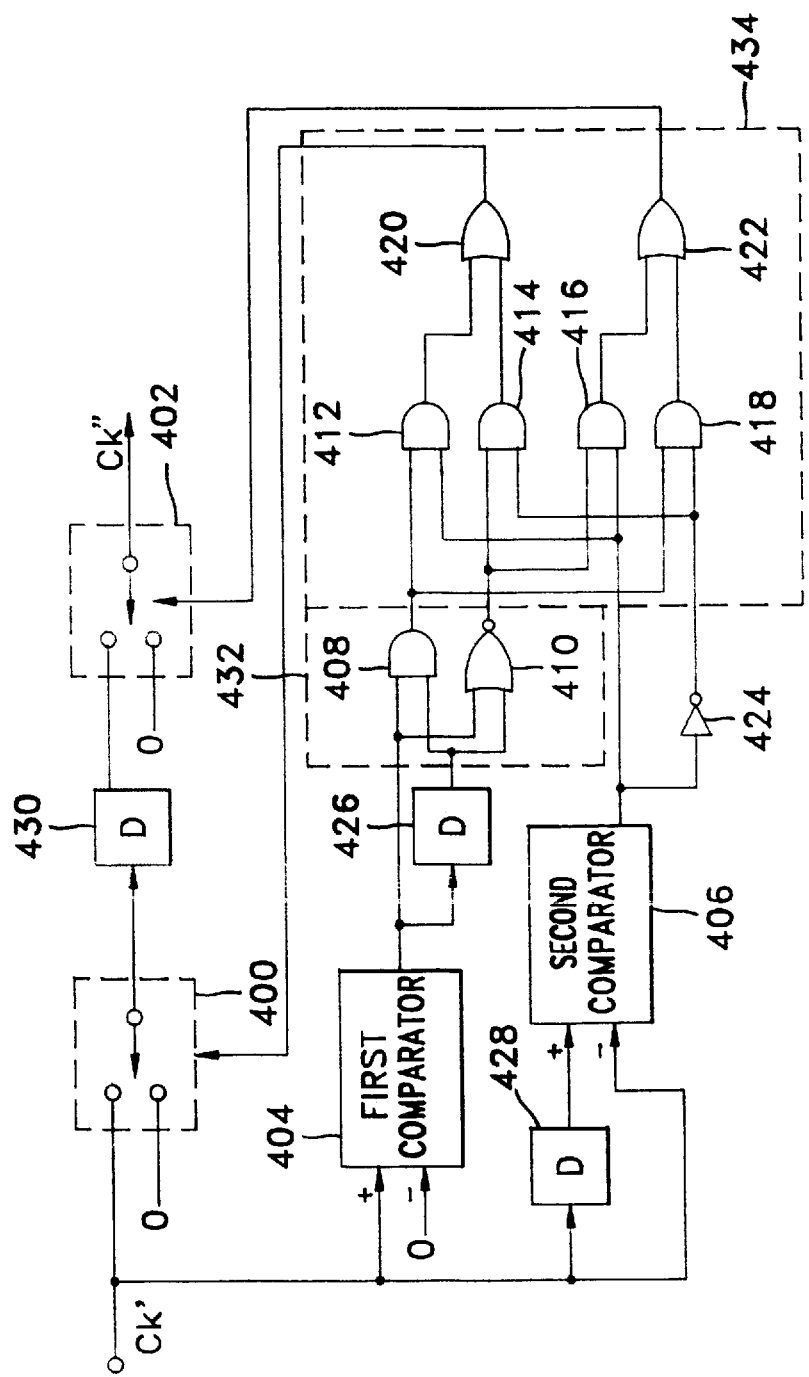
FIG. 4 is a detailed circuit diagram of the signal corrector shown in FIG. 2.

FIG. 2 shows a digital signal detector according to the present invention. In a method of recording and reproducing a digital signal in a recording/reproducing portion, an integration detector 22 is used to detect a signal by converting input binary data into a non-return-to-zero inverter (NRZI) signal to then record the converted signal on a magnetic tape, and reproducing the recorded signal to then detect its original signal.

The digital signal detector shown in FIG. 2 includes a precoder 10 for converting an input digital signal into an NRZI-waveform signal and outputting the result, a recording/reproducing portion 12 for recording and reproducing the NRZI signal output from the precoder 10, a linear equalizer 14 for compensating the distorted amplitude of the signal reproduced by the recording/reproducing portion 12, a signal corrector 20 for correcting the output from the linear equalizer 14, an integration detector 22 for integrating the output from the signal corrector 20, and a predecoder 24 for decoding the output from the integration detector 24 into its original signal.

FIG. 3 shows an NRZI system including the precoder 10 and recording/reproducing portion 12.

In the NRZI system of FIG. 3, reference numerals 30 and 32 denote storage elements representing signal delay, reference numeral 34 is an adder, and reference numeral 36 is an exclusive-OR gate.

The exclusive-OR gate 36, receiving an input digital signal Ak and a signal Bk-1 produced by delaying a signal Bk output from the precoder 10 by one symbol space, precodes the input signals to then output a Bk signal. The output signal Bk is then output as a signal Ck via the recording/reproducing portion 12 having the recording/reproducing portion feature (1-D).

Hereinafter, a detailed description will be given with reference to FIGS. 2 and 3.

In the device shown in FIG. 2, a signal amplitude is distorted by recording a signal having a short wavelength for a high density record, and the compensation for this distortion upon reproducing is accomplished by the linear equalizer 14. The signal reproduced in the recording/reproducing portion 12 and its previous signal (delayed by 1T wherein T denotes a delay time) interfere with each other due to the differentiation feature of the recording/reproducing portion 12, but are also interrelated with each other. That is, if the reproduced signal indicates 1, the next signal must be a 0 or −1 signal and, similarly, the −1 signal is surely followed by a 0 or 1 signal. Therefore, excluding the 0 signal conditions, the 1 signal must be followed by a −1 signal and the −1 signal must be followed by a 1 signal, such that the 1 and −1 signals alternate. Therefore, if the 1 signal is followed by a 1 signal or the −1 signal is followed by a −1 signal, it can be determined that the recording/reproducing portion has generated an error. For example, supposing that a (+1,0,0,−1) signal is reproduced by an ideal recording/reproducing portion and that a (+1,+0.56,−0.56,−1) signal is reproduced by the present system, the conventional digital signal detector using a ±0.5-level threshold detector would detect the reproduced signal as a (1,1,1,1) signal, meaning that two errors are generated. Therefore, the signal corrector 20 shown in FIG. 2 corrects a signal value to compensate for such a signal distortion component, whereby the probability of error generation is reduced and thus the entire system performance is improved.

In FIG. 4, which is a detailed block diagram of the signal corrector 20, an input signal Ck' is received from the linear equalizer 14 and an output signal Ck" is provided for the integration detector 22. The signal corrector of FIG. 4 comprises first and second switches 400 and 402, first and second comparators 404 and 406, delay elements 426, 428 and 430, and first and second logic means 432 and 434. Here, the first and second switches 400 and 402 are operated in accordance with first and second control signals generated from the logic means.

Basically, the signal corrector 20 corrects the signals reproduced by the recording/reproducing portion 12 by using the partial-response feature of the recording/reproducing portion; namely, the alternating repetition of +1 and −1 signals, such that, if the present value of the reproduced signal in the recording/reproducing portion is positive, its next value cannot be positive, and likewise for negative signal values.

First, the Ck' signal is input to one of two inputs of the first switch 400. Meanwhile, the Ck' signal is also fed to the positive input of a first comparator 404 for comparison with a "0" level value and to the negative input of a second comparator 406 for comparison with a 1T-delayed input signal.

Also, the output signal of the first comparator 404 and a 1T-delayed output signal thereof are logically multiplied through a first AND gate 408 and logically summed through a NOR gate 410, to then output the logically operated signals.

The outputs of the second comparator 406 and the first AND gate 408 are logically multiplied through a second AND gate 412, and then output. The outputs of the second comparator 406 and the NOR gate 410 are logically multiplied through a fourth AND gate 416, and then output.

The inverted output of the second comparator 406, which is output via an inverter 424, and the output of the first AND gate 408 are logically multiplied in a third AND gate 418.

The inverted output of the second comparator 406 and the output of the NOR gate 410 are logically multiplied in a fifth AND gate 414.

The outputs of the fifth AND gate 414 and the second AND gate 412 are logically summed in a first OR gate 420 and then output to the first switch 400 to control the same.

Also, the outputs of the third and fourth AND gates 418 and 416 are logically summed through a second OR gate 422 and then output to the second switch 402 to control the same.

In the first switch 400, either a 0 signal or the reproduced signal input to the first switch 400 is selected and output according to the control signal of the first switch 400 (i.e., the output signal from the first OR gate 420). The output signal is delayed by a time 1T through the delay element 430 and then output to the second switch 402.

In the second switch 402, either a 0 signal or the 1T-delayed output of the first switch 400 is selected in accordance with the control signal of the second switch 402 (i.e., the output signal from the second OR gate 422). The selected signal is output to the integration detector as a Ck" signal.

According to this method, the present value of a reproduced signal by using the differentiation feature, i.e., the partial response of the recording/reproducing portion, is determined by amplitude values of "before and after" (previous and present) signals. For example, if a present signal value is +0.8 and the previous signal value is +0.2, the previous signal value is changed into a "0" value; and if a present signal value is +0.2 and the previous signal value is +0.8, the present signal value is changed into the "0" value. Likewise, if a present signal value is –0.8 and the previous is signal value is –0.2, the previous signal value is changed into a "0" value; and if a present signal value is –0.2 and the previous signal value is –0.8, the present signal value is changed into the "0" value. That is, assuming a positive signal value, if the next signal value is also positive, the values are compared and the smaller value is replaced with a "0" value; and for a negative signal value followed by another negative, the larger value is replaced with the "0" value. In this method, the distortion component of signals is corrected.

Figure 5:
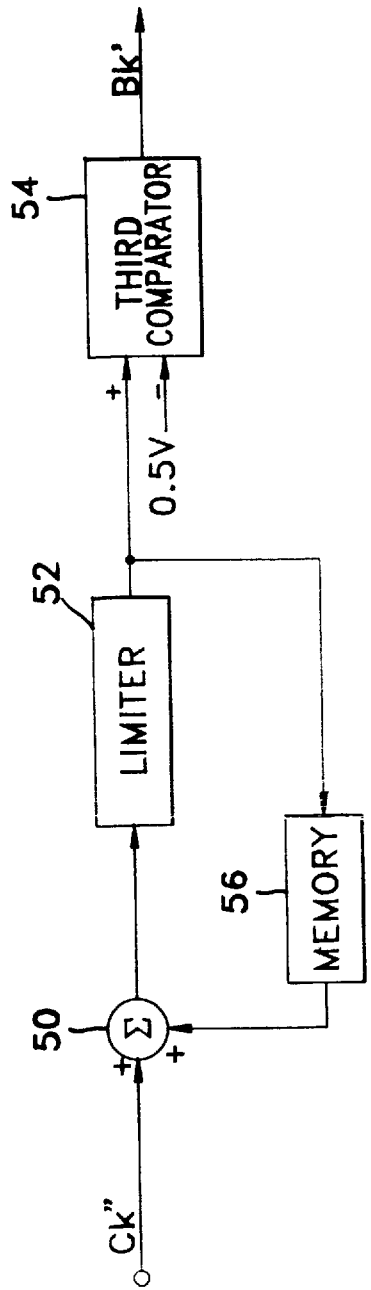
FIG. 5 is a detailed circuit diagram of the integration detector shown in FIG. 2.

FIG. 5 is a detailed block diagram of the integration detector 22 shown in FIG. 2. The integration detector is constituted by an adder 50, a limiter 52, a third comparator 54 and a memory 56.

Referring to FIG. 5, the input signal Ck" is added to its previous signal (which was integrated through the limiter 52 and the memory 56) in the adder 50. When a differentiated value of an ideal recording/reproducing portion is integrated, the integrated value has a 0 or 1 value. Thus, the integrated value has an ideal value between the 0 and 1 values, but departs from this value due to the characteristics of the recording/reproducing portion and noise. Then, if the integrated signal continues to be integrated in its imperfect state, there is even greater discrepancy in the resultant signal value. Therefore, the integrated value must be limited to a value between the 0 and 1 values via the level limiter 52. Namely, if the integrated value is smaller than the 0 value, it is limited to the 0 value; and if it is larger than the 1 value, it is limited to the 1 value. The signal output from the level limiter 52 is fed back and stored in the memory 56 and input to the third comparator 54. The signal input to the third comparator 54 is compared with the threshold level value 0.5, and if it is smaller than 0.5, a 0 value is output. Otherwise, a 1 value is output.

Figure 6:
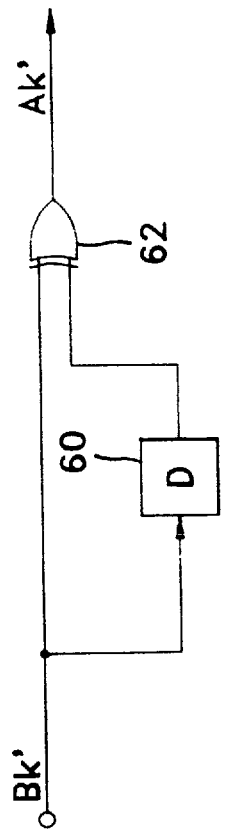
FIG. 6 is a detailed circuit diagram of the predecoder shown in FIG. 2.

FIG. 6 shows a detailed circuit of the predecoder 24 shown in FIG. 2, which is constituted by a delay element 60 and an exclusive-OR 62. Here, the input signal Bk' output from the integration detector (FIG. 5) is exclusive-OR-operated with a signal which is the input signal Bk' delayed by a time 1T, to then output an output signal Ak'.

As described above, the digital signal detector according to the present invention detects corrected signals, when the reproduced signals output from the recording/reproducing portion for recording and reproducing digital signals are in poor condition, by using the correlation of signals due to the partial-response (differentiated) feature of the recording/reproducing portion and then integrating the corrected signal using a differentiated component of the recording/reproducing portion. The integrated signal is then limited, to thereby reduce errors due to the accumulation of integration error values. Therefore, performance of the entire system is improved. Also, the circuit configuration is simplified to reduce hardware accordingly.

What is claimed is:

1. A digital signal detector for a magnetic recording/reproducing device, comprising:

a precoder for converting an input digital signal into a non-return-to-zero-inverter (NRZI) waveform signal;

a recording/reproducing portion for recording the signal output from said predecoder and reproducing the recorded signal;

a linear equalizer for compensating an amplitude distortion of the signal reproduced by said recording/reproducing portion;

a signal corrector for correcting a signal output from said linear equalizer using a correlation process and producing a corrected signal;

an integration detector for integrating the corrected signal produced by said signal corrector; and a predecoder for decoding the signal integrated by said integration detector into an original signal, wherein, in said signal corrector, if present and previous values of the signal output from said linear equalizer are both positive, the smaller of the present and previous values is corrected to "0"; and if a negative signal value of the signal output from said linear equalizer is followed by another negative value, the larger of the two negative values is corrected to "0", wherein said signal corrector uses the correlation process, said correlation process being based upon a differentiation feature of said recording/reproducing portion, to perform the corrections to "0".

2. A digital signal detector for a magnetic recording/reproducing device as claimed in claim 1, wherein said signal corrector comprises:

a first comparator for comparing an input signal with a "0" signal;

first delay means for delaying the output of said first comparator by a delay time (1T);

second delay means for delaying the input signal by the delay time (1T);

a second comparator for comparing the input signal with the output of said second delay means;

first logic means for logically combining the output from said first comparator with the output of said first delay means and outputting an AND resultant and an OR resultant;

a first switch for selecting one signal from among the input signal and the "0" signal, in accordance with a first control signal and outputting the selected signal;

a second switch for selecting, in accordance with a second control signal, one signal from among the "0" signal and a signal which is the signal output from said first switch and then delayed by the delay time (1T); and second logic means for generating said first and second control signals based on the outputs of said first logic means and said second comparator.

3. A digital signal detector for a magnetic recording/reproducing device as claimed in claim 2, wherein said first logic means comprises:

a first AND gate for receiving the output from said first comparator and the output of said first delay means; and a NOR gate for receiving the output from said first comparator and the output of said first delay means.

4. A digital signal detector for a magnetic recording/reproducing device as claimed in claim 2, wherein said second logic means comprises:

a second AND gate for logically combining the output from said second comparator with the AND-operated output from said first logic means, and outputting the resultant;

a third AND gate for logically combining an inverted output from said second comparator and the OR-operated output from said first logic means, and outputting the resultant;

a fourth AND gate for logically combining the output from said second comparator and the OR-operated output from said first logic means, and outputting the resultant;

a fifth AND gate for logically combining the AND-operated output from said first logic means with the inverted output from said second comparator, and outputting the resultant;

a first OR gate for logically combining the outputs from said second and third AND gates, and outputting the resultant as the first control signal;

a second OR gate for logically combining the outputs from said fourth and fifth AND gates, and outputting the resultant as the second control signal.

5. A digital signal detector for a magnetic recording/reproducing device as claimed in claim 1, wherein said integration detector comprises:

an adder for summing and accumulating a signal output from said signal corrector and a next-previous integrated signal to produce an integrated signal;

a limiter for limiting the value of the integrated signal output from said adder to a range between 0 and 1, so as to reduce signal integration errors, and outputting the limited signal;

a memory for storing the signal output from said limiter and outputting the stored signal to said adder; and a third comparator for comparing the signal output from said limiter with a threshold value and outputting a "1" signal if the limiter output signal value is larger than the threshold value and outputting a "0" signal if the former is smaller than the latter.

* * * * *